March 12, 1968  S. K. HAMBLING  3,372,778
ACTUATING MEANS FOR SPOT-TYPE DISC BRAKES
Filed April 13, 1966  2 Sheets-Sheet 1

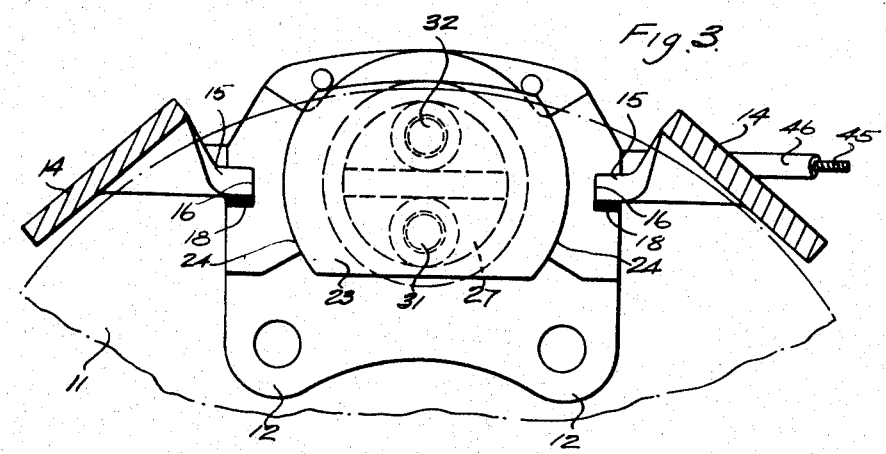
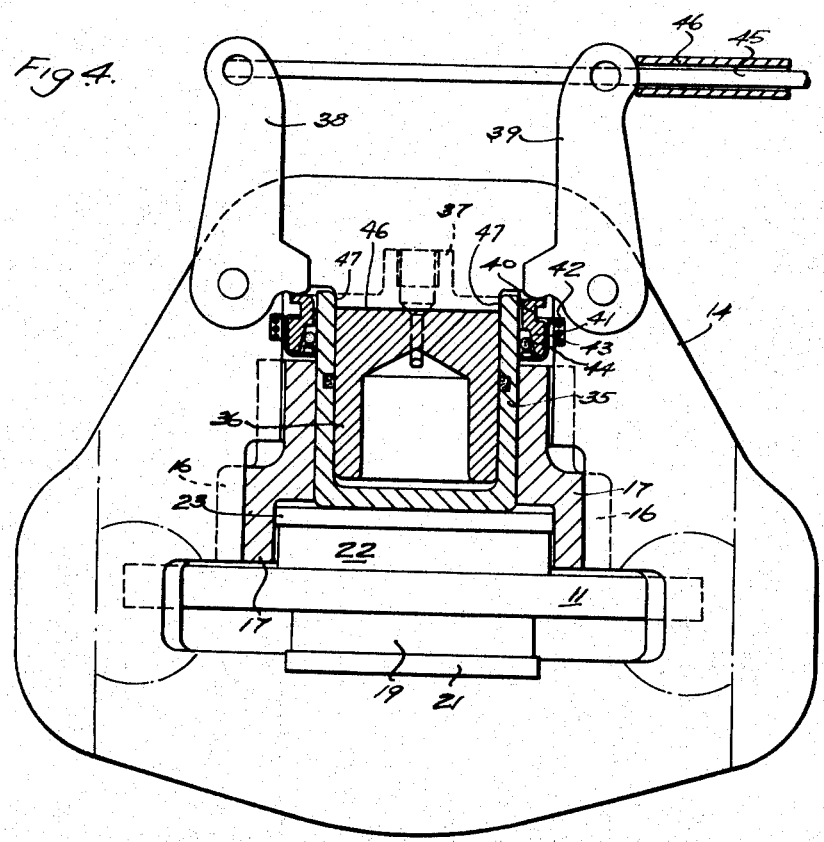

United States Patent Office 3,372,778
Patented Mar. 12, 1968

3,372,778
ACTUATING MEANS FOR SPOT-TYPE
DISC BRAKES
Stewart K. Hambling, Tamworth, England, assignor to Girling Limited, Tyseley, England, a British company
Filed Apr. 13, 1966, Ser. No. 542,356
Claims priority, application Great Britain, Apr. 13, 1965, 15,592/65
7 Claims. (Cl. 188—152)

ABSTRACT OF THE DISCLOSURE

In a disc brake of the sliding yoke reaction type provided with an hydraulic actuator, the actuator comprises a hollow piston working in a bore in a stationary member and a second piston working in the first piston, one piston applies one friction pad directly to the disc and the other piston acts on the yoke to move it axially and bring a second friction pad carried by the one into engagement with the opposite face of the disc when fluid under pressure is supplied by the pistons.

Detailed description

This invention relates to improvements in disc brakes of the kind in which friction pads are applied to opposite sides of a rotatable disc by an hydraulic actuator located in or carried by a stationary member located on one side of the disc, the actuator applying one friction pad directly to the disc and applying the other friction pad to the disc through a yoke or the like which straddles a portion of the periphery of the disc and is axially movable relative to the stationary member.

According to one feature of my invention, in a brake of the kind set forth the hydraulic actuator comprises a bore in the stationary member, a hollow piston or plunger working in the bore, and a second piston or plunger working in the first, one piston or plunger engaging and acting on the directly actuated friction pad and the other engaging and acting on the yoke.

In one arrangement the second piston or plunger acts on the directly actuated friction pad and the closed end of the first piston or plunger acts on the yoke and has an axially projecting spigot which is transversely slotted to receive a portion of the yoke. Hydraulic fluid is conveyed to the space between the pistons or plunger by a flexible pipe connected to the outer end of a passage extending through the spigot.

In another arrangement the closed end of the first piston or plunger engages the directly actuated friction pad and the second piston or plunger engages the yoke and is slotted at its outer end to receive a portion of the yoke.

According to another feature of my invention means are provided for applying the brake mechanically from a hand-brake lever by means of coupled bell-crank levers pivotally mounted on the yoke and acting through a one-way clutch on the piston or plunger engaging the directly actuated friction pad, the arrangement being such that application of the brake hydraulically for service braking does not affect the hand-brake.

Two embodiments of our invention are illustrated by way of example in the accompanying drawings in which:

FIGURES 3 and 4 are sections similar to FIGURES 1 and 2 but incorporating means for applying the brake mechanically.

Figure 1:
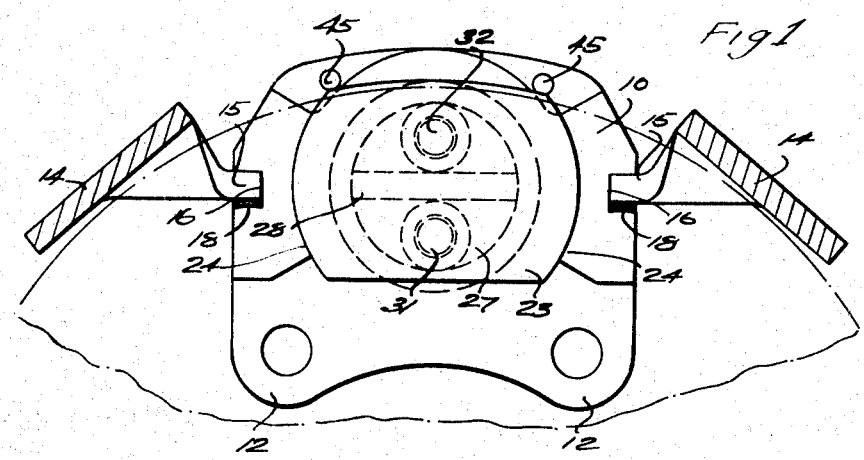
FIGURE 1 is a section of a caliper for a disc brake in a plane parallel to the disc.
Figure 2:
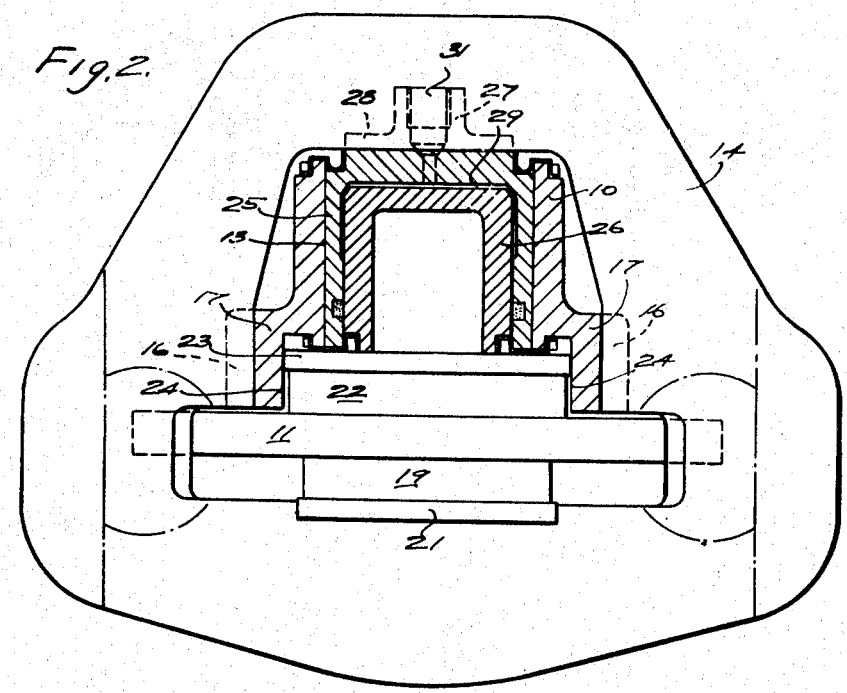
FIGURE 2 is a section in a plane parallel to the axis of the disc and chordal to the disc.

In the arrangement illustrated in FIGURES 1 and 2 a stationary member 10 located on one side of a rotatable brake disc 11 has inwardly projecting apertured lugs 12 to receive bolts by which it is secured to a non-rotatable part adjacent to the disc. A cylinder bore 13 is formed in the member 10, the axis of the bore being at right angles to the plane of the disc. Fitting over the stationary member 10 is a rigid yoke 14 which straddles a portion of the periphery of the disc to which it is chordal. Parallel opposed edges 15 of an opening in the yoke in which the member 10 is received are slidably engaged in parallel outwardly facing grooves 16 in spaced arms 17 integral with the member 10 and extending forwardly towards the disc, the free ends of the arm being close to the adjacent surface of the disc. The radial depth of the grooves 16 is greater than the thickness of the yoke as shown in FIGURE 1 and waved blade springs 18 are located between the yoke and the radially innermost walls of the grooves to allow the yoke to slide freely but without rattle in a direction at right angles to the plane of the disc.

A friction pad 19 for engagement with the face of the disc remote from the stationary member 10 is mounted on a backing plate 21 secured in a recess in one edge of the opening in the yoke. A friction pad 22 for engagement with the face of the disc adjacent to the stationary member 10 is mounted on a rigid backing plate 23 which is slidably guided between parallel guiding surfaces 24 on the inner side of the arms 17 on the stationary member.

The friction pad 22 is applied directly to the disc by an hydraulic piston 25 in sliding and sealing engagement with a hollow outer piston 26 which is itself slidable in the bore 13 in the stationary member 10.

The closed outer end of the piston 26 has an axially projecting spigot 27 which is transversely slotted at 28 to receive a portion of the yoke.

Hydraulic fluid is conveyed to the space 29 between the pistons by a flexible pipe connected to the outer end of a passage 31 extending through the spigot. A second passage 32 is provided for bleeding purposes and is normally closed by a bleeding screw.

When hydraulic fluid under pressure from a master cylinder or the like is supplied to the space 29 the pistons 25 and 26 are urged apart in an axial direction. The piston 25 applies the friction pad 22 directly to the adjacent face of the disc and the piston 26 moves the yoke in the opposite direction to apply the friction pad 19 to the opposite face of the disc.

Whatever the direction of rotation of the disc the torque or drag on the friction pad 22 is taken directly by one of the arms 17 and the torque on the friction pad 19 is taken through the yoke by the other arm 17 so that each arm only has to resist the torque on one friction pad.

In the modified arrangement shown in FIGURES 3 and 4 the directly actuated friction pad 22 is applied to the disc by the closed inner end of a hollow piston 35 slidable in the bore 13 in the stationary member 10 while the yoke is actuated by the closed outer end of a piston 36 in sliding and sealing engagement with the machined inner surface of the wall of the piston 35. The outer end of the piston 36 is formed with a slotted axially projecting spigot 37 to receive a spigot portion 46 of the yoke.

This spigot portion 46 has opposed side faces 47 which engage with the inner surfaces of a recess in piston 36.

This arrangement also incorporates means for applying the brake mechanically from a hand-lever or the like for parking or emergency braking. Coupled bell-crank levers 38 and 39 are pivotally mounted on the yoke on opposite sides of the axis of the cylinder bore 13. The outer end of the piston 35 is extended outwardly beyond the outer end of the bore 13 in the stationary member and its outer surface is engaged by short arms of the bell-crank levers through one-way clutches housed in recesses in the yoke.

Each clutch comprises a wedge member 40 urged by a spring 41 against a step or shoulder 42 in the recess in the yoke and having an inclined edge 43 on the side next the piston.

A ball 44 is located between the inclined edge and the surface of the piston, the inclination being in such a direction that the piston can move freely past the wedges in the hydraulic application of the brake. When the bell-crank levers are actuated the wedges are moved in a direction to cause the balls to jam between the wedges and the surface of the piston which is moved axially by the wedges to apply the directly actuated friction pad 22 to the disc, the other friction pad 19 being applied through the yoke by the reaction on the pivots of the bell-crank levers.

The bell-crank levers are actuated simultaneously by a bowden cable transmission, the cable 45 being connected to one lever and the casing 46 bearing on the other.

In a modification the two diametrically opposed wedge members 40 can be replaced by a ring of corresponding cross-section slidably mounted on the extension of the piston 35.

In both of the arrangements illustrated the backing plate 23 of the directly actuated friction pad 22 has slightly curved or straight and parallel inner and outer edges and part-circular ends centred on the axis of the cylinder bore 13 as shown in FIGURES 1 and 3. The guiding surfaces 24 on the inner sides of the arms 17 with which the part-circular ends of the backing plate slidably engage are complementarily curved. The radial dimension of the backing plate is less than its length between the part-circular ends, and to remove the friction pad when worn the backing plate is rotated through 90° and then withdrawn radially through the gap between the arms 17. Rotation of the backing plate and pad assembly is normally prevented by removable pins 45 mounted in the stationary member and slidably engaging with the outer edge of the backing plate near its ends.

I claim:

1. A disc brake comprising a rotatable disc, a stationary member located on one side of the disc, a first friction pad assembly slidably mounted for movement towards and away from the disc, a cylinder bore in the stationary member, the axis of the bore being substantially at right angles to the plane of the disc, a first piston working in said bore and having a bore, a closed end engaging with and acting on said first friction pad assembly and an open end, a second piston working in the bore in said first piston, a yoke straddling the stationary member and a portion of the periphery of the disc and slidably guided for movement in a direction parallel to the axis of the disc, a spigot on said yoke located in the open end of said first piston, opposed side faces of said spigot engaging with opposed parts of a recess in said second piston, a second friction pad assembly carried by said yoke for engagement with the side of the disc remote from said stationary member, and means for supplying hydraulic fluid under pressure between the pistons.

2. A disc brake as claimed in claim 1, wherein said second piston has an axially extending spigot having a transverse slot to receive said spigot portion of said yoke, said slot having a base portion acting on a part of said spigot portion of said yoke with which it engages.

3. A disc brake as in claim 1 further incorporating mechanical applying means mounted on the yoke and one-way clutch mechanism through which said means act on said first piston which engages and acts on said first friction pad.

4. A disc brake as in claim 1 further incorporating coupled bell-crank levers pivotally mounted on the yoke, an extension of the first piston beyond the end of the bore in the stationary member remote from the disc, and one-way clutch mechanism interposed between said levers and said extension for mechanical application of the brake independently of the hydraulic application.

5. A disc brake comprising a rotatable disc, a stationary member located on one side of the disc, a first friction pad assembly slidably mounted for movement towards and away from the disc, a cylinder bore in the stationary member, the axis of the bore being substantially at right angles to the plane of the disc, a first piston working in said bore and having a bore, a closed end engaging with and acting on said first friction pad assembly, an extension beyond the end of the bore in the stationary member remote from the disc and having an open end remote from the closed end of said piston, a second piston working in the bore in said first piston, a yoke straddling the stationary member and a portion of the periphery of the disc and slidably guided for movement in a direction parallel to the axis of the disc, a spigot on said yoke located in the open end of said first piston, opposed side faces of said spigot engaging with opposed parts of a recess in said second piston, a second friction pad assembly carried by said yoke for engagement with the side of the disc remote from said stationary member, means for supplying hydraulic fluid under pressure between the pistons, bell-crank lever means pivotally mounted on said yoke, wedge means adapted to be engaged by said lever means and interposed between the extension of said first piston and an adjacent part of said yoke, said wedge means having an inclined edge adjacent to said piston and at least one ball located between said extension and said inclined edge, the direction of inclination of said inclined edge being constructed and arranged such that said first piston can move freely past said wedge means when the brake is actuated hydraulically but on actuation of said lever means said wedge means are moved in a direction to cause the ball to jam between the wedge means and the piston which is thereafter moved axially in the bore in said stationary member.

6. A disc brake as claimed in claim 5, wherein said bell-crank lever means comprise a pair of coupled bell-crank levers, and pivotal connections mounting said bell-crank levers on said yoke on opposite sides of the main axis of said stationary member, and wherein said wedge means comprise wedge members, located between diametrically opposed positions on the extension of said piston and said adjacent parts of said yoke, spring means urging each wedge member in a direction towards said bell-crank lever with which it co-operates and against a shoulder on said yoke, and a ball located between said piston and said inclined edge of each wedge member.

7. A disc brake as claimed in claim 5, wherein said bell-crank lever means comprise a pair of coupled bell-crank levers, and pivotal connections mounting said bell-crank levers on said yoke on opposite sides of the main axis of said stationary member, and wherein said wedge means comprises a ring slidably mounted on said extension of said piston with said inclined edge adjacent to said piston, and spring means urging said ring in a direction towards said bell-crank levers with which it co-operates and against shoulders on said adjacent parts of said yoke.

References Cited

UNITED STATES PATENTS

| 3,211,261 | 10/1965 | Chouings | 188—73 |
| 3,245,500 | 4/1966 | Hambling et al. | 188—73 |
| 3,269,490 | 8/1966 | Swift | 188—72 |
| 3,269,491 | 8/1966 | Belart et al. | 188—73 |

FOREIGN PATENTS 905,797   9/1962   Great Britain.

MILTON BUCHLER, *Primary Examiner.*

G. E. HALVOSA, *Assistant Examiner.*